United States Patent [19]
Cottingham

[11] 4,044,819
[45] Aug. 30, 1977

[54] HYDRIDE HEAT PUMP

[75] Inventor: James G. Cottingham, Center Moriches, N.Y.

[73] Assignee: The United States of America as represented by the United States Energy Research and Development Administration, Washington, D.C.

[21] Appl. No.: 657,519

[22] Filed: Feb. 12, 1976

[51] Int. Cl.$^2$ ............................................. F28D 15/00
[52] U.S. Cl. ........................................... 165/1; 60/649; 62/2; 62/4; 126/263; 126/270; 165/107; 165/DIG. 17
[58] Field of Search ........... 165/1, 107, 106, DIG. 17; 126/270, 263; 62/4; 60/649, 655

[56] References Cited
U.S. PATENT DOCUMENTS
3,943,719  3/1976  Terry et al. ............................. 60/644

*Primary Examiner*—Leland A. Sebastian
*Attorney, Agent, or Firm*—Dean E. Carlson; Leonard Belkin

[57] ABSTRACT

Method and apparatus for the use of hydrides to exhaust heat from one temperature source and deliver the thermal energy extracted for use at a higher temperature, thereby acting as a heat pump. For this purpose there are employed a pair of hydridable metal compounds having different characteristics working together in a closed pressure system employing a high temperature source to upgrade the heat supplied from a low temperature source.

7 Claims, 3 Drawing Figures

HYDRIDE HEAT PUMP

This invention was made under a contract with the United States Energy Research & Development Administration.

BACKGROUND OF THE INVENTION

In the operation of power plants and other systems in the generation of power, there is usually the rejection of large amounts of thermal energy at relatively low temperatures. Some of those low temperature sources of energy are useful to space heating which does not require high temperature sources while in many other situations, and, in fact, more typically, high temperature sources of thermal energy (i.e., oil burning furnaces) are degraded for use in situations requiring more low grade heat (i.e., space heating).

There are ways which have been developed to make greater use of low temperature sources of thermal energy, even at temperatures not high enough for space heating. One such method is the so-called heat pump, which is the reversed refrigeration cycle. This method has the drawback of requiring the use of direct electrical power for its operation.

SUMMARY OF THE INVENTION

The present invention relates to the use of hydrides to extract heat from one temperature source and deliver the thermal energy extracted for use at a higher temperature, in effect, acting as a heat pump.

It is well known that certain metals and alloys when exposed to hydrogen will react and form hydrides which will decompose when the temperature is raised above its so-called decomposition temperature. Typically, the hydriding of such a material is exothermic in nature, that is, heat is given off during the hydriding process while heat must be added to obtain the release of the hydrogen held in bondage.

Efforts have been made and are being made to use the hydriding characteristics of certain intermetallic compounds to store thermal energy, and one such system for storing solar energy is described in a paper by G. Libowitz appearing in page 322 of the Proc. of the 9th Intersociety Energy Conversion Engineering Conference.

The invention described and claimed herein, however, is directed to the use of hydrides as a heat pump, that is, for transferring thermal energy from one temperature source to a higher temperature source for use at the higher temperature, rather than merely storing it for use.

In accordance with a preferred embodiment of this invention, there is provided a method of transferring thermal energy from a source at a first temperature and delivering same for use at a higher temperature comprising the steps of heating a first hydride to a temperature above its decomposition temperature causing its decomposition and release of hydrogen, exposing a hydridable intermetallic compound having a decomposition temperature lower than the decomposition temperature of said first hydride to said hydrogen in a pressure sealed system so that the pressure of said system increases during the aforesaid release of the hydrogen, forcing the hydriding of the second hydride and the decomposition of the first hydride. The formation of the second hydride is exothermic and the heat released is extracted at a useful temperature and delivered to the load thereafter removing the source of heat from said first compound and exposing the hydride of the second compound to a source of heat at the lower temperature, thereby reducing the pressure within said system to where the temperature of the hydride of the second compound is above its decomposition temperature and the temperature of the first compound is below its decomposition temperature for the reduced pressure conditions, thereby causing the release of hydrogen from the second compound and the hydriding of the first compound.

During this process exothermic heat is released by the formation of the first hydride and is extracted and delivered to the load at the same useful temperature as before. All elements of the process are now returned to their original state and now the input energy is stored. Energies extracted from the high temperature driving source and the low temperature source are both delivered at useful temperatures to a common load. This results in effectively pumping heat from a lower temperature for use at a higher temperature.

The compounds employed are intermetallic in nature and which have the characteristics of forming hydrides when exposed to hydrogen at a temperature below the so-called decomposition temperature for any given pressure. When one compound is compared to another with respect to their decomposition temperatures, it is understood herein that this comparison is made for the same pressure. It is also understood that the decomposition temperature of a hydride rises as the pressure rises so that when the pressure of the system is lowered, a lower decomposition temperature exists which may be above or lower than the low temperature source exposed to a particular compound.

It is thus a principal object of this invention to utilize hydrides for the pumping of thermal energy for use at a higher temperature than the source of such energy.

other objects and advantages of this invention will hereinafter become obvious from the folowing description of preferred embodiments of this invention.

DESCRIPTION OF THE PREFERRED EMBODIMENTS

Figure 1:
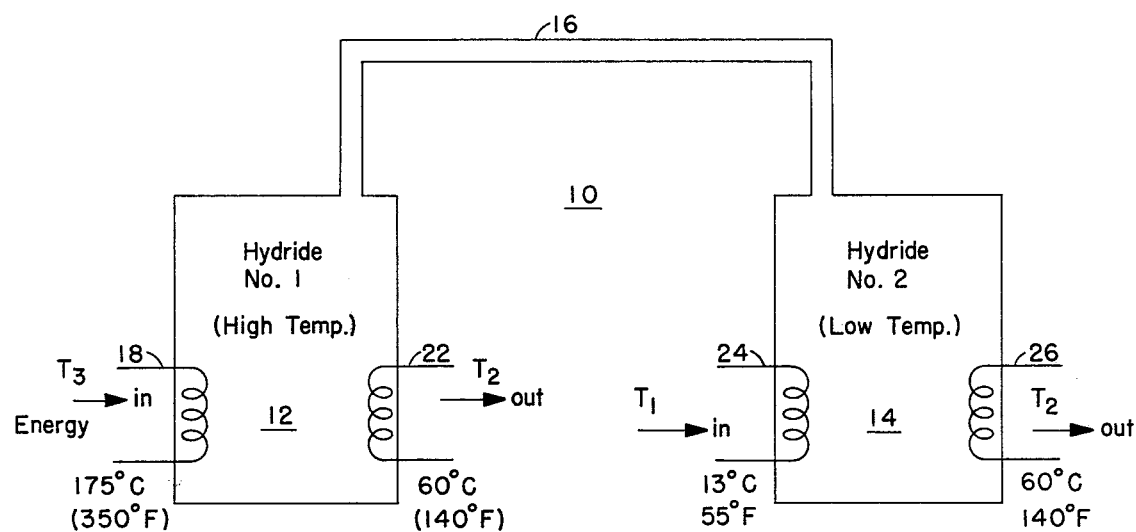
FIG. 1 illustrates schematically a preferred embodiment of this invention.

Referring to FIG. 1 there is shown a basic arrangement of a hydride heat pump in accordance with the principles of this invention embodied in a closed system 10 consisting of a first hydride bed 12 and a second hydride bed 14 interconnected by a suitable conduit 16 forming a pressure sealed assembly. Illustrated schematically are suitable means 18 for supplying heat to bed 12 and means 22 for withdrawing heat from this bed. Similarly, bed 14 is provided with means 24 and 26 to supply or withdraw heat, respectively.

In the operation of the arrangement shown in FIG. 1, the source of low grade heat is at means 24, at the lowest temperature of the system, designated for purposes of discussion $T_1$. Typically, $T_1$ would be an ambient temperature, 13° C (55° F). The thermal energy would be delivered at a higher temperature $T_2$, at both means 22 and 26. Typically, for heating purposes, $T_2$ would be about 60° C (140° F). Some motivating thermal energy at still a higher temperature $T_3$ would be delivered to the system by way of means 18. Typically, $T_3$ would be about 175° C (350° F) and could use a steam source.

Initially, bed 12 would contain a hydride whose decomposition temperature for the then pressure of the system would be below that of temperature $T_3$. Bed 14 would contain the dehydride of a hydridable intermetallic compound the decomposition temperature of which for the then existing pressure of the system is above that of its temperature $T_2$.

As heat energy is suplied by way of means 18 to bed 12 at the temperature $T_3$, the hydride decomposes and hydrogen is released which is being absorbed by the compound in bed 14. Heat is released at bed 14 and extracted by way of means 26 at a temperature of about $T_2$, the delivery temperature of system 10.

When this exchange runs its course, close to or near the complete dehydriding of bed 12, which it should be noted will also cause a decrease in pressure within the system, the delivery of heat by means 18 is terminated as is also the extraction of heat by means 26. It should be noted that it is not necessary to dehydride completely bed 12.

The process just described is then reversed. Bed 12 is cooled by exposing it to means 22 which can be the same output sink for the heat as that provided for means 26. The first hydride is thus cooled below its decomposition temperature for the new pressure condition which results in a hydriding exothermic process which delivers heat to the output sink at temperature $T_2$. The cooling of bed 12 results in a lowering of pressure within the system which causes a lowering of the decomposition temperature of bed 14 to the point where decomposition takes place.

This is an endothermic reaction and heat is supplied at the lowest temperature of the system, $T_1$, by way of means 24 which can withdraw heat from a low grade source of heat. This process is now the driving process which maintains the hydrogen pressure in beds 10 and 14 forcing the formation of the first hydride. This process continues until all elements have been returned to their original chemical state completing the cycle. For example, as previously mentioned, the effect of the complete cycle is to receive thermal energy at low and high temperatures and deliver thermal energy at an intermediate temperature. Another way to view the cycle is that by supplying a relatively small amount of energy at a high temperature it is possible to withdraw additional amounts of heat from a low temperature source and deliver both quantities for use at an intermediate temperature. That is, far more useful thermal energy is obtained than by merely mixing thermal energies from the low and high temperatures.

The cycle as described may be repeated continuously alternately the delivery of thermal energy at temperature $T_2$ between means 22 and 26. By the use of multiple such systems, or by alternating fluid flow between means 22 and 26 it is seen that a continuous flow of thermal energy at temperature $T_2$ can be maintained.

Figure 2:
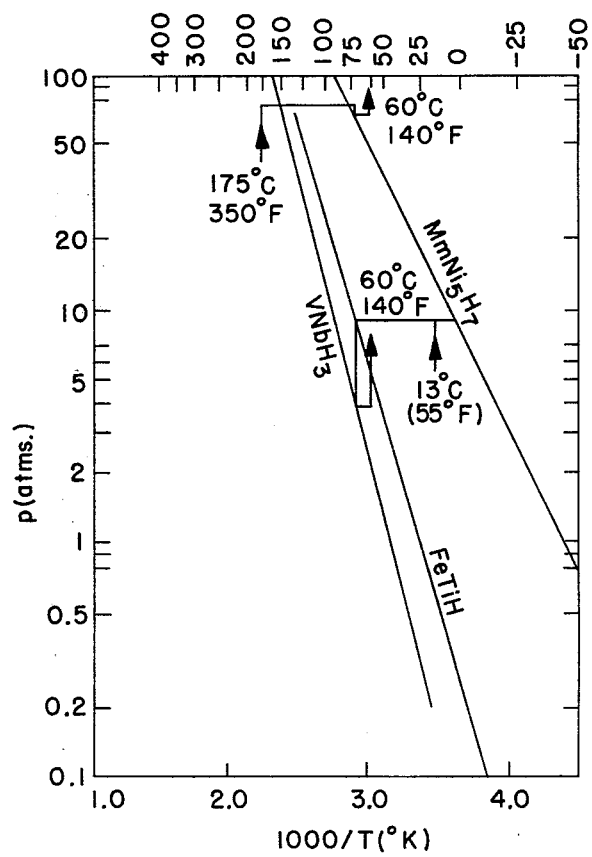
FIG. 2 shows the equilibrium pressure-temperature characteristics for several materials and their hydrides.

The following is a working example of the system just described:

FIG. 2 shows the equilibrium pressure-temperature characteristics for 3 materials, Vanadium Niobium Trihydride ($VNbH_3$), Iron Titanium Hydride (FeTiH) and "Mischmetal" Nickel Hydride ($MmNi_5H_7$) (Mischmetal is a commercial mixture of rare earths.) If $VNbH_3$ and $MmNi_5H_7$ are chosen as the two working hydrides, energy supplied at a temperature of 175° C would pump energy from a low temperature sink of 13° C and deliver both quantities of energy to a 60° C load. These temperatures were chosen as typical for a building using a hot water heating system and being fed from a steam main with steam at 175° C which is typical for a laboratory facility, for example. The heats of reaction for these hydrides are:

$MmNi_5H_7$ 5.93 kcal/mole
FeTiH 7.0 kcal/mole
$VNbH_3$ 11.02 kcal/mole

Thus for each mole. of $H_2$ transferred through the heat pump 5.93 k cal are pumped from 13° to 60° C and 11.02 k cal is required to drive this action. A total of 16.94 k cal is delivered to the load for an energy gain of a factor of 1.54 over the conventional direct heating method. Thermal losses have been neglected, but practical temperature and pressure drops have been allowed to force the reation at a reasonable rate.

If FeTiH were doped to move its characteristic over to lie near that of $VNbH_3$, the performance would be improved because the FeTiH has a more favorable reaction heat. In this case the gain factor becomes (7.0 + 5.93)/7.0 = 1.85. This is 64% of the performance of an ideal heat engine working between the same temperatures and is reasonable when compared with other types of real heat pumps.

Figure 3:
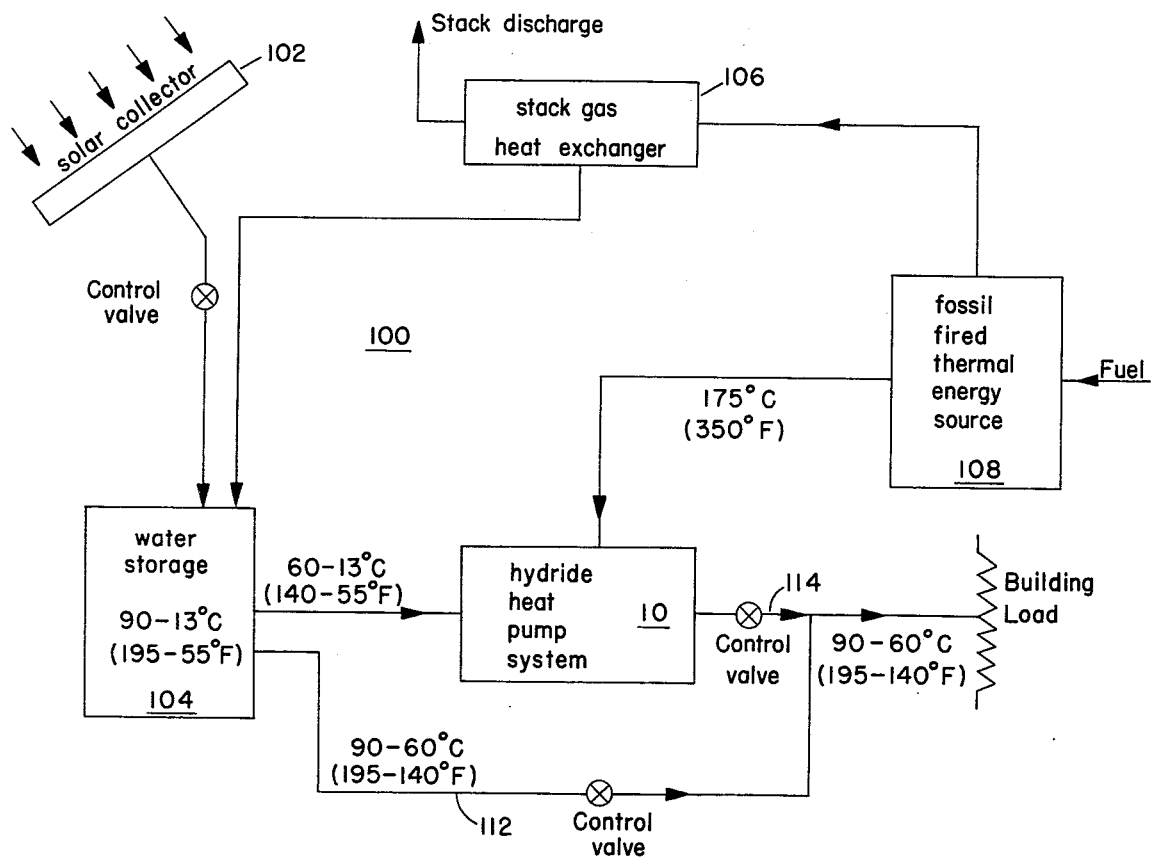
FIG. 3 shows a system embodying this invention employing solar energy as a heat source.

A particularly advantageous application of this invention is its use in the recovery of solar energy for space heating. Referring to FIG. 3 there is shown such a system 100 consisting of a typical flat plate collector 102, a tank 104 for storing water heated by collector 102, hydride heat pump system 10 shown in FIG. 1, a stack gas heat exchanger 106, and a fossil fired thermal energy source 108.

In the operation of the system just described, solar collector 102 will heat water at a temperature up to about 90° C (195° F). When so heated this water can be employed directly to meet the requirements of the building load as shown in the flow line 112 bypassing the hydride heat pump system 10.

When solar collector 102 is not working due to lack of sunlight or where it is producing insufficient amount of heat then water from storage tank 104 at a temperature below 60° C (140° F) is fed to hydride heat pump system 10 where it is used in conjunction with heated water at 175° C (350° F) from fossil fired thermal energy source 108 to produce heated water in flow line 114 to meet the requirements of the building load. Stack gas heat exchanger 106 is designed to recover some of the waste heat from energy source 108.

The systems described can be operated manually with the use of appropriate pumps contained within the various units described, or as is understood in the art, automatic operation may be devised in accordance with state of the art.

There has thus been described apparatus and method for the effective use of low temperature sources of heat such as solar sources which has fewer moving parts than comparable heat pumping systems, and uses thermal sources directly as opposed to electrical sources.

What is claimed is:

1. A system for the transfer of thermal energy from a first temperature to and for use at an elevated, second temperature comprising:
   a. first container means having within a hydrided first compound at a temperature below its decomposition temperature;

b. second container means having within a dehydrided second hydridable compound whose decomposition temperature is lower than the decomposition temperature of the first hydrided compound, the second compound being at a temperature below its decomposition temperature;

c. means communicating the interior of said first container means with said second container means forming a pressure sealed system;

d. means for heating the hydrided first compound above both of said second temperature and its decomposition temperature for a sufficient period to release its hydrogen and causing the pressure within both said container means to rise, said second compound being hydrided thereby, thermal energy being released by said second compound during hydriding at said second temperature until dehydriding is terminated in said first container means causing a decrease in pressure in said system;

e. means for thereafter cooling said first container means at said second temperature and exposing said second container means to a heat soruce at said first temperature reducing the pressure within said system sufficiently whereby said second temperature is above the decomposition temperature of said second hydride and said first compound is below its decomposition temperature at the reduced pressure, whereby said second hydride decomposes causing release of hydrogen which is absorbed by said first compound, said first compound releasing thermal energy at about said second temperature, said system effectively transferring thermal energy from said heat source at said first temperature for use at said second temperature.

2. The system of claim 1 in which said compounds are intermetallic compounds.

3. The system of claim 2 in which said heat source comprises a solar energy collector and an energy storage element.

4. The method of pumping heat from a first temperature for use at an elevated, second temperature comprising the steps of:

a. heating a hydride of a first hydridable intermetallic compound to a temperature above its decomposition temperature causing its decomposition and relese of hydrogen;

b. exposing to said hydrogen in a pressure sealed system a second hydridable intermetallic compound having a decomposition temperature lower than that of the first compound at said secondtemperature which is below its decomposition temperature, thermal energy being released from said second compound at said second temperature, the pressure within said system rising during the aforesaid release of hydrogen; and c. thereafter removing the source of heat from said first compound and exposing the hydride of said second compound to a source of heat at said first temperature, thereby reducing the pressure within said system to where the temperature of the hydride of said second compound is above its decomposition temperature and the temperature of said first compound is below its decomposition temperature, thereby causing the release of hydrogen from said second compound and the hydriding of said first compound, and effectively pumping heat from the source of heat at the first temperature for use at the elevated, second temperature.

5. The method of claim 4 in which the steps are repeated to attain the continuous delivery of thermal energy.

6. The method of claim 5 in which the source of heat at said first temperature comprises a solar heat collector and an energy storage element.

7. A solar energized system for delivering a continuous source of heat at a delivery temperature comprising:

a. solar collector means for delivering heat at said delivery temperature when said collector means is energized;

b. a hydride heat pump system for receiving heat at below said delivery temperature from said solar collector means when the latter is not energized;

c. a thermal energy source for delivering heat at a temperature above the aforesaid delivery temperature when said solar collector means is not energized;

d. said hydride heat pump system including means for delivering heat at said delivery temperature, the latter said means employing differing first and second hydridable intermetallic compounds having differing decomposition temperatures forming a pair of beds in a pressure sealed system alternating in hydriding and dehydriding so as to deliver thermal energy at said delivery temperature and employing the thermal energies received from said thermal energy source and from said solar collector means at temperatures above and below said delivery temperature, respectively, to effect the operation of said hydride heat pump system.

* * * * *